P. F. HAZEN.
BALANCING MECHANISM FOR SCALES.
APPLICATION FILED JAN. 31, 1914.
1,115,931.
Patented Nov. 3, 1914.
2 SHEETS—SHEET 1.
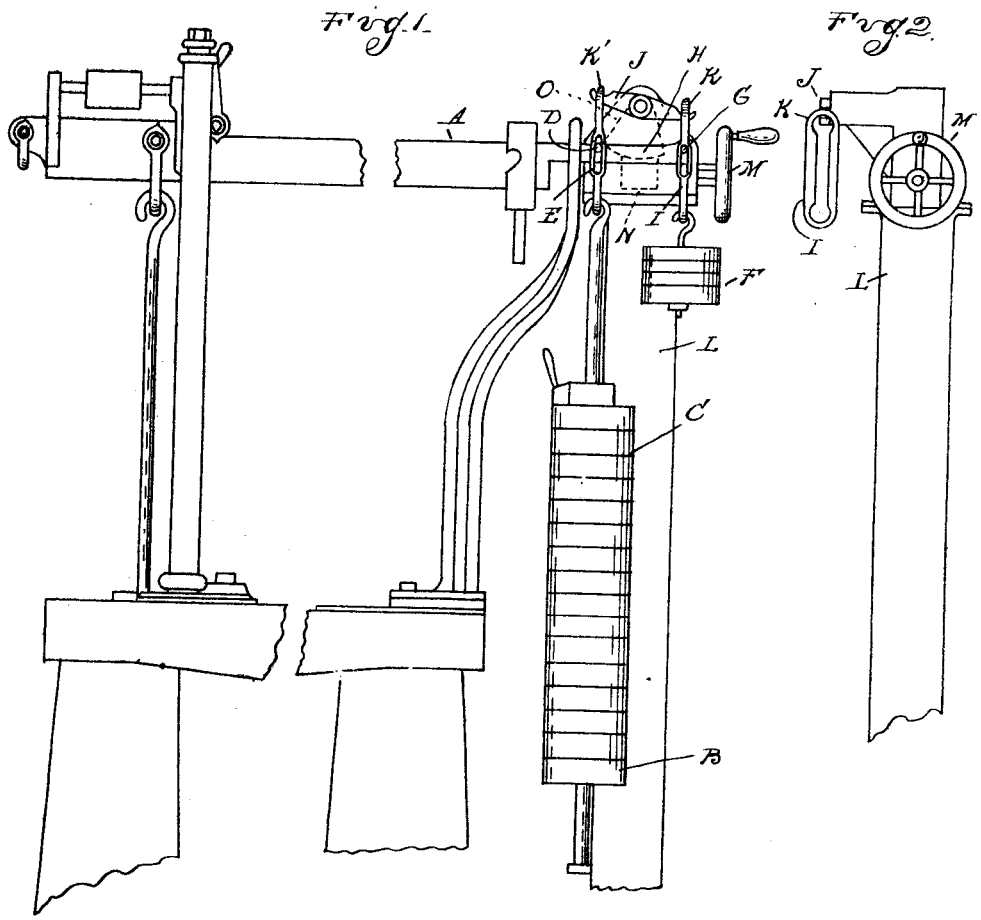
Witnesses
W. K. Ford
James P. Barry
Inventor
Perley F. Hazen
By Whittemore Hulbert & Whittemore
Att'ys

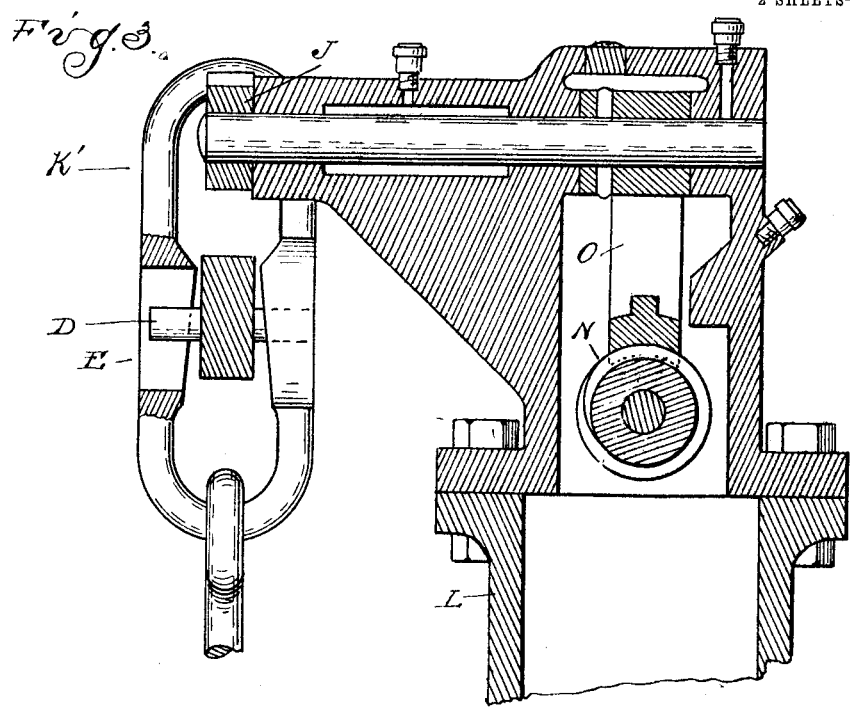

UNITED STATES PATENT OFFICE.

PERLEY F. HAZEN, OF ST. JOHNSBURY, VERMONT, ASSIGNOR TO E. AND T. FAIRBANKS AND COMPANY, OF ST. JOHNSBURY, VERMONT, A CORPORATION OF VERMONT.

BALANCING MECHANISM FOR SCALES.

1,115,931.  Specification of Letters Patent.  Patented Nov. 3, 1914.

Application filed January 31, 1914. Serial No. 815,794.

*To all whom it may concern:*

Be it known that I, PERLEY F. HAZEN, a citizen of the United States of America, residing at St. Johnsbury, in the county of Caledonia and State of Vermont, have invented certain new and useful Improvements in Balancing Mechanism for Scales, of which the following is a specification, reference being had therein to the accompanying drawings.

The invention has more particular reference to large hopper scales such as are used in the weighing of grain and of a type in which the weights are carried by a counterpoise. In operation it is necessary to test the accuracy of the scale by restoring the same to balance after the weighing of each draft, which is usually accomplished by the removal of the detachable weights from the counterpoise. This involves considerable labor on the part of the attendant and also a loss of valuable time.

It is the object of the present invention to provide a simple means of quickly testing the balance of the scale with little effort on the part of the operator, and to this end the invention comprises the construction as hereinafter set forth.

In the drawings: Figure 1 is a side elevation of the weighing beam and counterpoise of a scale to which my improvement is applied; Fig. 2 is an end elevation thereof; and Fig. 3 is a cross section.

A is the weighing beam, B the counterpoise and C the detachable weights applied to the counterpoise. The counterpoise is normally supported upon the beam by the knife edge pivots D engaging bearings in the loop E. To avoid the necessity of removing the detachable weights I have provided an auxiliary counterweight F, which is adapted to be supported upon pivots G on an extension H of the beam, through the medium of a loop I similar in construction to the loop D. This auxiliary counterpoise is not, however, normally upon the pivots G, but is suspended from a rock arm or lever J which engages an upward extension K of the loop I. The lever J is fulcrumed upon a stationary support L and is provided with an oppositely-extending arm which is adapted to engage a corresponding extension K' on the loop E. The arrangement is such that by rocking the lever J, the loop E will be lifted so as to withdraw the same from bearing upon the pivots D, while this movement will also lower the link I and permit the same to engage the pivots G, thereby supporting the counterpoise F from the beam. As the counterpoise F will exactly balance the beam when no load is upon the scale, it is obvious that by thus rocking the lever J the weighted counterpoise will be thrown out of action and the unweighted counterpoise substituted therefor.

To lessen the labor of rocking the lever J, I preferably provide an operating mechanism, such as a hand-wheel M for rotating a worm N, engaging a worm segment O connected with the lever. The distance which the counterpoise and weights must be lifted is comparatively slight and therefore a few revolutions of the hand wheel will produce the desired effect without muscular effort on the part of the operator.

With the construction as described, after each draft of grain has been weighed, the operator by rotating the hand-wheel M lifts the counterpoise B and lowers the counterpoise F into engagement with the beam. If the latter is in balance a reverse movement of the handle M will restore the parts to normal position in which the scale is ready for the weighing of another draft.

What I claim as my invention is,—

1. In a scale, the combination with a weighing beam and a counterpoise therefor provided with detachable weights, of an unweighted counterpoise, and means common to both counterpoises for alternatively exchanging the engagement of the same with the beam.

2. In a scale, the combination with a weighing beam, a counterpoise therefor and detachable weights engaging said counterpoise, of a substitute counterpoise normally out of connection with the beam, and a single means for lifting the first-mentioned counterpoise out of engagement with the beam and for lowering the second-mentioned counterpoise into engagement therewith.

3. In a scale, the combination with a beam, a counterpoise and detachable weights carried by said counterpoise, of a substitute counterpoise, and a common means for alternatively lifting said counterpoises to substitute one for the other.

4. In a scale, the combination with a weighing beam, a counterpoise therefor and detachable weights for engaging said counterpoise, of a substitute counterpoise, a loop for suspending each counterpoise from the beam, and a means operatively connected to both loops for alternatively lifting the same to withdraw them from engagement with the beam.

5. In a scale, the combination with a weighing beam having an extension, of a counterpoise therefor, detachable weights for engaging said counterpoise, a substitute counterpoise adapted for engagement with the extension of the beam, a loop for each counterpoise embracing the beam, knife-edge pivots for supporting said loops from the beam, and means operatively connected with the loops for alternatively lifting them to withdraw the same from engagement with said knife-edge pivots.

6. In a scale, the combination with a weighing beam provided with an extension, of a counterpoise therefor, detachable weights for engaging said counterpoise, a substitute counterpoise attached for engagement with the extension of said beam, a loop for suspending each counterpoise from the beam provided with slotted pivot-engaging portions and an extension above the beam, knife-edge pivots engaging said slotted portions, and a rockable member for alternatively engaging the upward extensions of said loops to lift the same out of engagement with said pivots.

7. In a scale, the combination with a weighing beam provided with an extension, of a counterpoise therefor, detachable weights for said counterpoise, a substitute counterpoise adapted for engagement with the extension of the beam, a loop for each counterpoise embracing the beam, pivots for supporting said loops upon the beam, a rockable lever having oppositely extending portions for engaging said loops, and a worm gear operating mechanism for rocking said lever to alternatively lift said loops to substitute one counterpoise for the other.

8. In a scale, the combination with a weighing beam provided with knife edges, and a weighted counterpoise, of an unweighted counterpoise, connections between the counterpoises and the knife edges on the beam, and a means common to both counterpoises for alternately applying the same to the knife edges.

9. In a scale, the combination with a weighing beam having an extension provided with knife edge pivots, and a counterpoise for the beam provided with detachable weights, of an unweighted counterpoise for the beam, link connections between the counterpoises and the knife edge pivots, and a rock lever for alternately exchanging the application of the counterpoises to the beam.

In testimony whereof I affix my signature in presence of two witnesses.

PERLEY F. HAZEN.

Witnesses:
JOHN C. CLARK,
FRED C. BECK.